Dec. 8, 1970        H. SPIEGEL ET AL        3,545,111
CONVERTIBLE DISPLAY BOX PICTURE FRAME
Filed March 27, 1969        3 Sheets-Sheet 1

INVENTORS
Herbert Spiegel &
BY Isaac Zelcer
Polachek & Saulsbury
ATTORNEYS

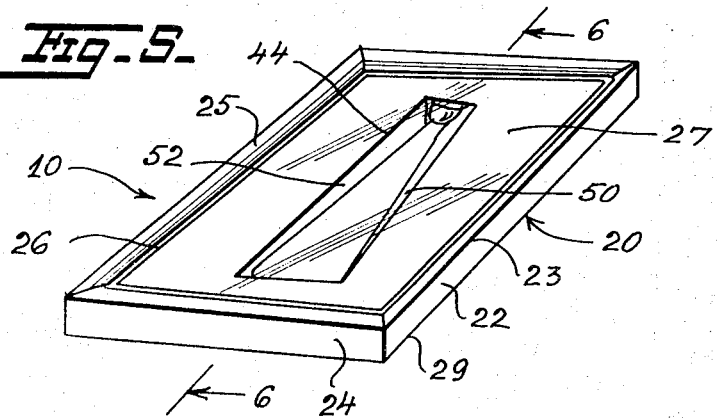
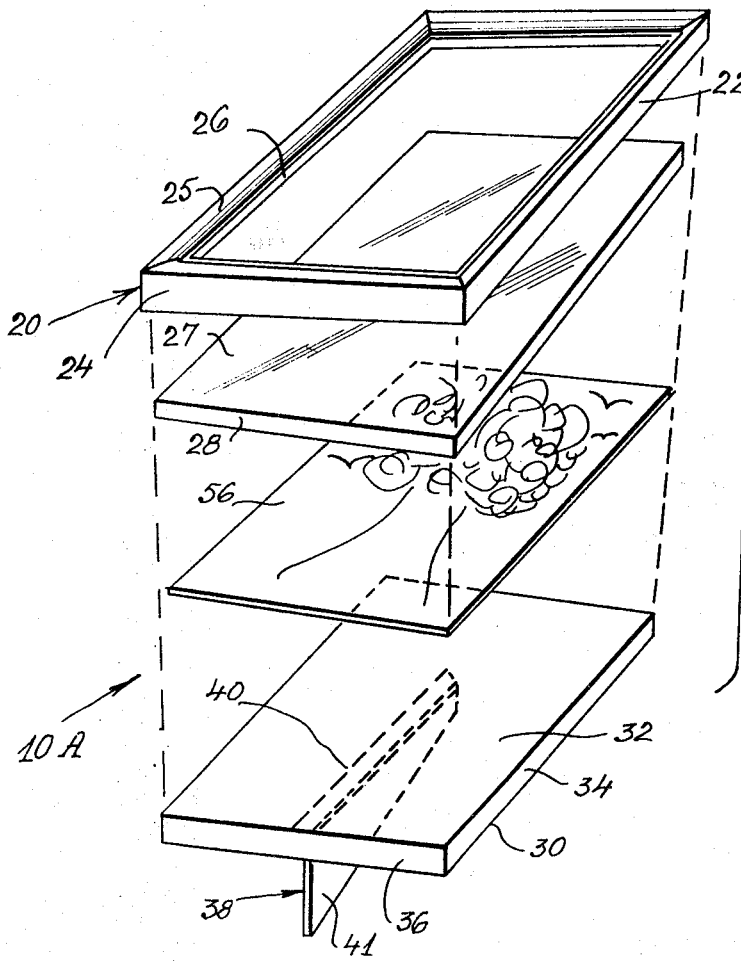

Dec. 8, 1970   H. SPIEGEL ET AL   3,545,111
CONVERTIBLE DISPLAY BOX PICTURE FRAME
Filed March 27, 1969   3 Sheets-Sheet 3
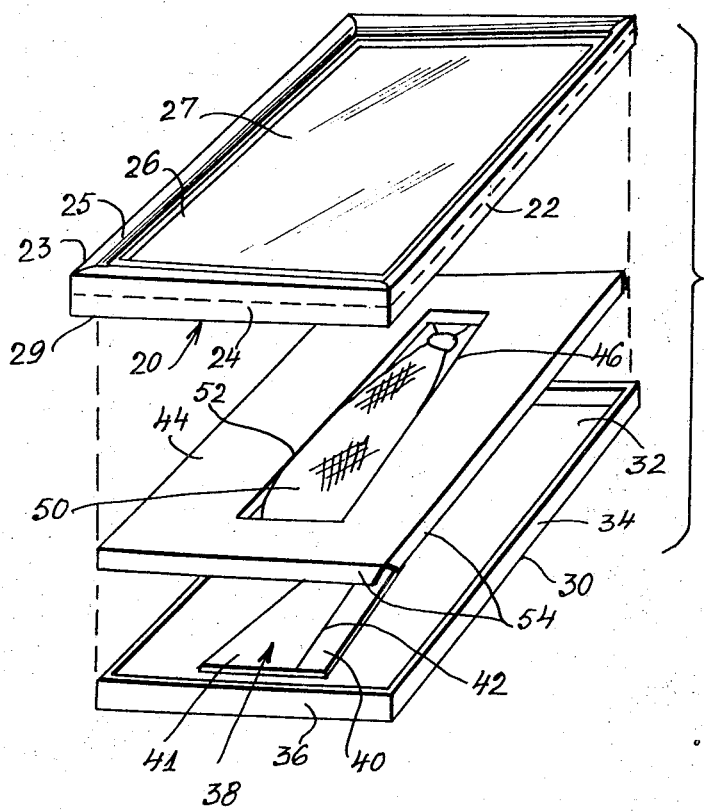
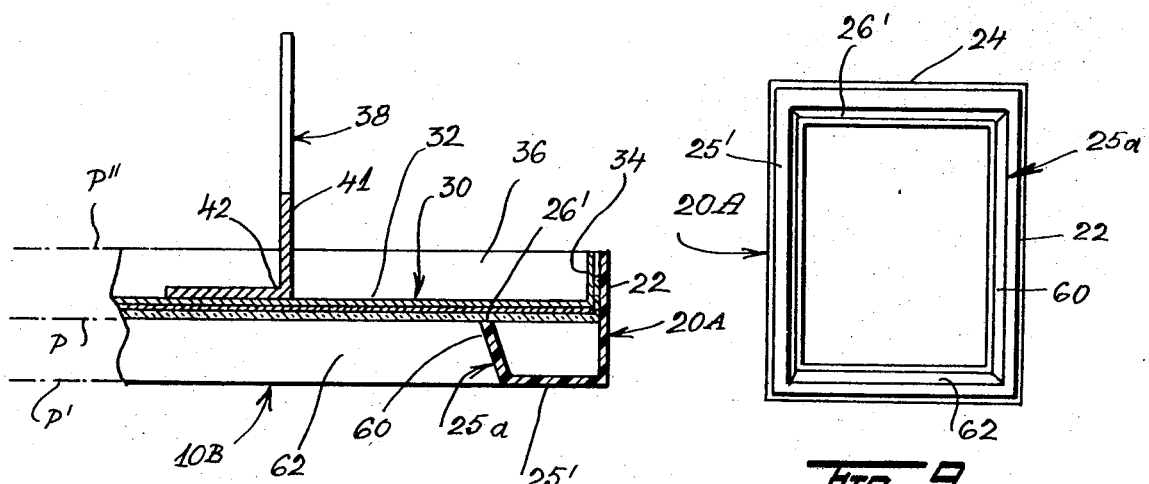
INVENTORS
Herbert Spiegel &
BY Isaac Zelcer
Polachek & Saulsbury
ATTORNEYS

United States Patent Office 3,545,111
Patented Dec. 8, 1970

3,545,111
CONVERTIBLE DISPLAY BOX PICTURE FRAME
Herbert Spiegel, 101 Deerfield Lane, Tenafly, N.J. 07670, and Isaac Zelcer, 23—62 Corporal Kennedy St., Bayside, N.Y. 11360
Filed Mar. 27, 1969, Ser. No. 811,020
Int. Cl. G09f 1/12
U.S. Cl. 40—152.1          9 Claims

ABSTRACT OF THE DISCLOSURE

A display box for merchandise is provided with a frame formed as a one-piece shell made of molded plastic material. The frame holds a transparent sheet in place over an open tray containing merchandise displayed for sale. After the merchandise is removed, the tray can be reversed and inserted into the frame with a picture disposed between the back of the tray and transparent sheet. A flat panel inside the tray can be folded out to form an easel to support the framed picture in upright position.

The invention relates to the art of framed display boxes and more particularly concerns a framed display box convertible to form a framed picture.

The invention constitutes an improvement over framed display box structures such as described in U.S. Pat. 1,882,157.

According to the present invention a one-piece plastic rectangular picture frame serves as a peripheral enclosure for a display box assembly in which merchandise is exposed behind a transparent plate or sheet. The assembly can be taken apart to remove the merchandise leaving the frame, transparent plate and box which can be reassembled to serve as a picture frame with hinged easel.

The invention will be explained in further detail in connection with the drawing, wherein:

FIG. 4 is an exploded perspective view of parts of the picture frame assembly of FIG. 1.

FIG. 5 is a perspective view of a display box assembly including parts of the picture frame assembly.

FIG. 7 is an exploded perspective view of parts of the display box assembly.

FIG. 8 is a sectional view similar to a part of FIG. 3 showing another picture frame assembly.

FIG. 9 is a reduced rear view of the picture frame per se of the assembly of FIG. 8.

Figure 6:
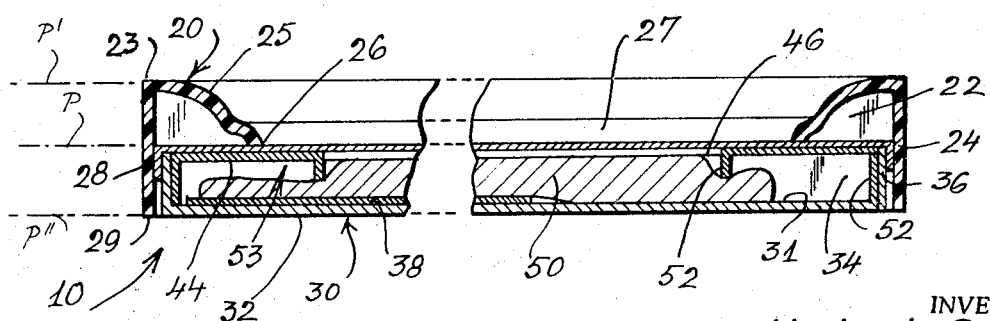
FIG. 6 is an enlarged cross-sectional view with parts broken away taken on line 6—6 of FIG. 5.

Referring first to FIGS. 5, 6 and 7, there is shown a display box assembly 10 including a rectangular picture frame 20. The frame has straight flat side and end walls 22, 24 integral with an inturned molding 25 defining a rectangular opening 26. The plane P of the inner edge or rim of opening 26 is located about midway between the plane P' of the outer face or edge 23 of the frame and plane P" of the open rectangular rear or bottom edge 29 of the frame. The entire frame is a one-piece shell of molded plastic material.

Snugly nested inside the frame abutting the rim of molding 25 is a transparent plastic sheet or plate 27. This sheet has turned down flanges 28 which abut the inner sides of walls 22, 24 of frame 20. Nested inside of or under sheet 26 is a tray 30. This tray has a rectangular back wall 32 and integral upstanding narrow vertical side and end walls 34, 36. On the inner side of back wall 32 is a panel 38. This panel has a flange 40 secured by an adhesive or otherwise to wall 32. A trapezoidal flap 41 is hinged to flange 40 at fold 42. The panel lies flat inside the tray. Flap 41 can be folded and extended outwardly to serve as an easel.

Removably disposed inside the tray is a card 44 having an opening 46 in which is engaged any desired type of merchandise 50, such as a necktie or the like. Turned down flanges 52 inside opening 46 and flanges 54 at the periphery of card 44 serve as spacers to define a compartment 55 with the back wall of tray 30.

The entire assembly 10 serves as an attractive display means for merchandise. The frame 20 serves to hold transparent sheet 27 in place over the merchandise to keep it fresh and clean. The customer who purchases the merchandise receives the entire assembly including the picture frame.

Figure 1:
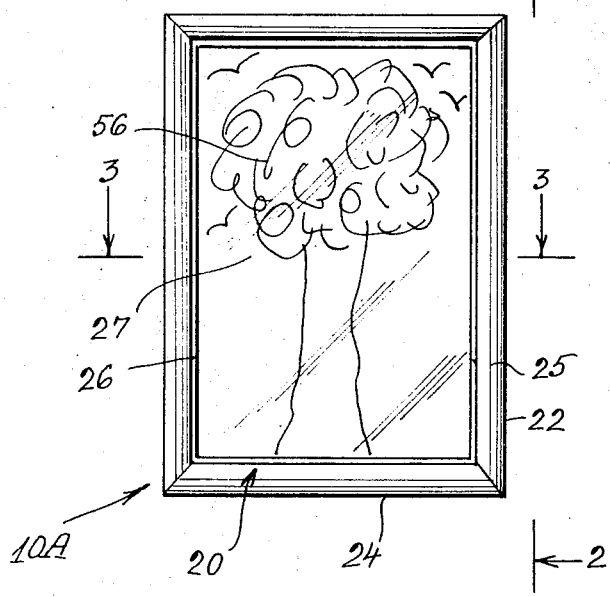
FIG. 1 is a front elevational view of a picture frame assembly according to the invention.
Figure 2:
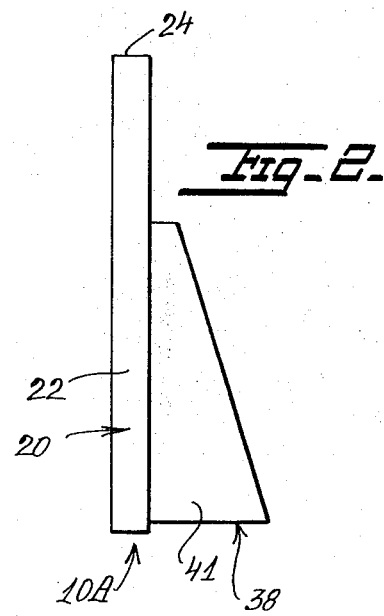
FIG. 2 is an edgewise elevational view taken on line 2—2 of FIG. 1.
Figure 3:
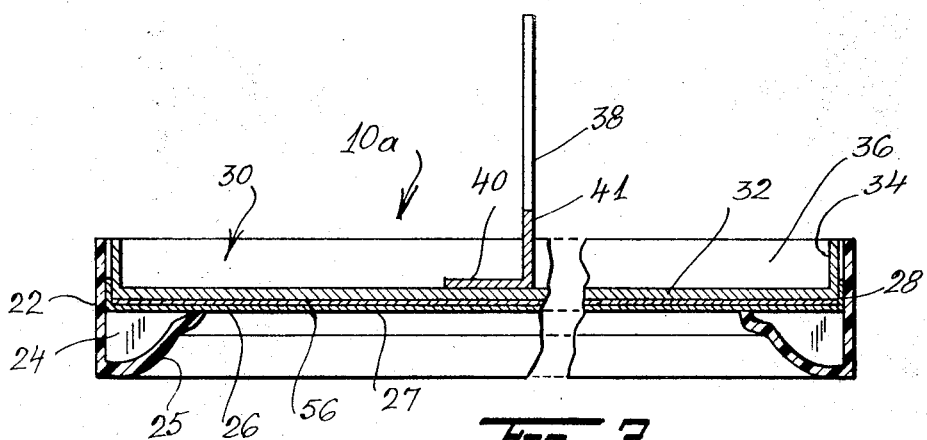
FIG. 3 is an enlarged cross-sectional view with parts broken away taken on line 3—3 of FIG. 1.

The merchandise is removed by removing tray 30 and card 44 from frame 20. Transparent sheet 27 can be left in place as indicated in FIG. 7 or it can be removed as indicated in FIG. 4, then the parts can be reassembled to form picture frame assembly 10A shown in FIGS. 1–3 to which reference is now made.

A rectangular picture 56 can be interposed between sheet 26 and back wall 32 of tray 30. The tray will be reversed from its position in the display assembly 10 so that the rear side of the tray faces forwardly and abuts the rear side of picture sheet 56. Flap 41 of panel 38 can be folded out into a plane perpendicular to wall 32 as clearly shown in FIGS. 2, 3 and 4, to serve as an easel for the framed picture assembly. The side and end walls of tray 30 fit snugly inside of the picture frame. The flanges 28 of sheet 27 are interposed between walls 22, 24 of frame 20 and walls 34, 36 of the tray. The parts of the picture frame assembly shown in FIG. 4 are quickly put together. No tools or particular skill is required. The parts nest in one another and frictionally engage each other so that no nails or fasteners are required. The parts can be quickly taken apart to replace picture 56 with another one.

The invention makes it possible to make practical use of parts of a merchandise display package which have heretofore generally been discarded after the merchandise is removed.

FIG. 8 shows part of another picture frame assembly 10B employing another structure for the picture frame. Parts corresponding to those of assembly 10 and 10A are identically numbered. The shell-like frame 20A shown in FIGS. 8 and 9 has straight flat side and end walls 22, 24 as in frame 20. Molding 25a has one section defined by a flat rectangular narrow wall 25' integral with forward edges of the side and end walls 22, 24 and perpendicular thereto. Inturned side and end walls 60, 62 are disposed angularly to wall 25'. Plane P of the rim 63 of opening 26' defined by the inner side and end walls 60, 62 is disposed between planes P' and P" of the front face and rear edge of frame 20A. FIGS. 8 and 9 show that the inner molding of the frame can have walls which are straight in configuration rather than curved as illustrated by molding 25 in FIG. 3.

In all forms of the invention, the rectangular picture frame is formed as a one-piece shell of molded plastic material. This structure is strong, light in weight, and inexpensive to manufacture by mass production plastic molding machinery and techniques.

What is claimed is:

1. A convertible display box picture frame assembly, comprising a rectangular picture frame being formed as a one-piece molded plastic shell with straight side and end rails integral with each other at ends thereof, said shell having flat side and end walls disposed perpendicular to parallel planes of front and rear edges of the shell with a molding extending inwardly of said walls and defining a rectangular opening at its free inner edge, said inner edge of the molding being disposed in a plane located midway between the planes of the front and rear edges of the shell; and a shallow trap fitted in said picture frame for containing merchandise and displaying the same in said rectangular opening, said tray having a flat rectangular back wall with narrow side and end walls extending perpendicular to the back wall at edges thereof, said side and end walls of the tray fitting snugly inside the side and end walls of the frame, whereby the tray can be reversed in the shell so that the back wall serves as a backing for a picture interposed between the back wall of the tray and said inner edge of the molding.

2. A convertible display box picture frame assembly as defined in claim 1, further comprising a transparent sheet interposed between the tray and the inner edge of the molding to serve as a cover for the tray and merchandise, whereby the transparent sheet serves to cover and protect the picture when the tray is reversed in the shell and the picture is interposed between the back wall of the tray and the transparent sheet.

3. A convertible display box picture frame assembly as defined in claim 1, further comprising a flat hinged easel secured to said back wall inside the tray and foldable outward to serve as a support for the framed picture when the tray is reversed in the shell.

4. A convertible display box picture frame assembly as defined by claim 1, wherein the molding is curved in cross section between the inner edge of the shell and outer sides thereof.

5. A convertible display box picture frame assembly as defined by claim 1, wherein the molding has a flat rectangular section disposed in the plane of the forward edge of the shell with inner walls extending angularly to said flat rectangular section.

6. A convertible display box picture frame as defined by claim 2, wherein the transparent sheet has narrow flanges at its edges interposed between the walls of the tray and the walls of the shell respectively.

7. A convertible display box picture frame assembly as defined by claim 6, further comprising a flat hinged easel secured to said back wall inside the tray and foldable outward to serve as a support for the framed picture when the tray is reversed in the shell.

8. A convertible display box picture frame assembly as defined by claim 7, wherein the molding is curved in cross section between the inner edge of the shell and the outer sides thereof.

9. A convertible display box picture frame assembly as defined by claim 7, wherein the molding has a flat rectangular section disposed in the plane of the forward edge of the shell with inner walls extending angularly to said flat rectangular section.

References Cited

UNITED STATES PATENTS

| 959,922 | 5/1910 | Cohn | 229—8 |
| 1,544,214 | 6/1925 | Bruns | 40—312 |
| 1,940,328 | 12/1933 | Schrotenboer | 40—152X |
| 2,001,820 | 5/1935 | Irelan | 40—152 |
| 2,252,147 | 8/1941 | Warren | 40—312 |

JEROME SCHNALL, Primary Examiner

W. J. CONTRERAS, Assistant Examiner

U.S. Cl. X.R.
206—45.31; 229—8